United States Patent Office 2,955,986
Patented Oct. 11, 1960

2,955,986

IMPROVED FERMENTATION PROCESS FOR THE PRODUCTION OF DIAMINOPIMELIC ACID

Hsing T. Huang, Fresh Meadows, Joan M. Griffin, Forest Hills, and John H. Fried, White Plains, N.Y., assignors to Chas. Pfizer & Co., Inc., New York, N.Y., a corporation of Delaware No Drawing. Filed Nov. 20, 1957, Ser. No. 697,530

7 Claims. (Cl. 195—47)

This application is concerned with an improved method for the preparation of diaminopimelic acid. More particularly, it is concerned with the improved production of diaminopimelic acid by microbiological means.

Diaminopimelic acid is an important and valuable intermediate in the industrial production of L-lysine, an essential amino acid of industrial importance. As described in U.S. Patent 2,771,396, diaminopimelic acid may be decarboxylated to lysine by the enzyme systems of strains of the species *Aerobacter aerogenes* and those strains of *Escherichia coli* which do not require L-lysine for growth. Further, the above described patent discloses the production of diaminopimelic acid by cultivation of a mutant of *E. coli* which requires L-lysine for growth in a fermentation medium comprising cornsteep liquor and glycerol under submerged aerobic conditions.

It has now been found that diaminopimelic acid may be produced in higher yield at a greater economy than heretofore possible resulting in a more economical and practical method of preparing L-lysine by the use of a double auxotroph of *E. coli* which requires both L-lysine and L-histidine for growth.

The double auxothoph of *E. coli* is prepared by the mutation of an L-lysine deficient auxotroph of *E. coli* with ultraviolet light followed by selection of the double auxotroph employing the penicillin method which is familiar to those in the art. The double auxotroph of *E. coli* grows in the form of small cocci. A growing culture of this organism has been forwarded to the American Type Culture Collection, Washington, D.C. where it has been assigned the number ATCC 13002.

The improved production of diaminopimelic acid is effected by the cultivation of *E. coli*, ATCC 13002 by means of an aerated deep tank, i.e. submerged, fermentation. In order to obtain a high yield of diaminopimelic acid, certain conditions must be carefully maintained. The fermentation should be maintained at near neutral pH values, for example, between about 6.0 and 9.0 but preferably between 6.5 and 8.0. It has been discovered that the use of sucrose and/or lactose as the carbon source is extremely helpful. Other carbon sources such as glycerol, maltose, mannitol and sorbitol may be employed but are not preferred because of the high cost of these compounds particularly, in relation to the comparatively low cost of readily available sucrose and lactose. When glucose is employed as the carbon source in the growth medium, extremely low yields of the product are obtained. In addition, it has been found that molasses which contains at least about 40% by weight of sucrose such as beet molasses is particularly effective. Not only does molasses provide sucrose to the fermentation medium but also acts as an economical source of L-histidine which is required for the growth of the double auxotroph. Beet molasses is found to give optimum results. Of course, as stated above, L-lysine in small amounts is required for the growth of the organism. L-histidine in small amount, must also be added to the fermentation medium when molasses is not incorporated as a source of carbohydrate.

Thus, by means of the newly discovered double auxotroph of *E. coli*, the addition of sucrose and/or lactose, the addition of L-lysine and the use of molasses which contains at least 40% by weight of sucrose, such as beet molasses, it has been found possible to produce diaminopimelic acid in more economical, large-scale industrial quantities than heretofore possible. Other molasses which contain less than 40% by weight of sucrose, such as cane molasses, are operable, but are not preferred since appreciably lower yields of diaminopimelic acid are obtained.

The fermentation is best conducted at a temperature of from about 25° to 40° C. although a temperature of from about 25° to 35° C. is preferred. In general, from 2 to 3 days are required, to obtain best yields. Usually, from about 50 to about 70 hours is found most suitable.

For best yields of diaminopimelic acid, L-lysine should be added to the fermentation medium at an initial concentration of from about 0.2 to about 0.4 gram/liter. It is found that from about 60 to about 80 grams per liter of sucrose and/or lactose may be used in the absence of molasses. L-histidine must then be added to the fermentation medium in an amount sufficient to provide from about 0.01 gram/liter to about 0.5 gram/liter. At higher concentration of L-histidine, the yield of diaminopimelic acid falls off appreciably. When molasses is employed in the amounts indicated below sufficient L-histidine is provided for the growth of the organism. Conversely, molasses may be used in the fermentation medium in the absence of sucrose and/or lactose. Usually an initial concentration of from about 40 g. to about 90 g. per liter of molasses with from about 10 g. to about 60 g. per liter of sucrose and/or lactose is found to give the highest yields of product. The amounts of each component may be varied within this range with no appreciable change in yield if the total weight of the carbohydrate sources is at least about 100 grams/liter. For example, the concentration of sucrose may be dropped to 10 g./liter, in which case the molasses concentration should be increased to about 90 g./liter for optimum results. Alternatively, from 100 to 140 grams per liter of molasses may be employed as the sole carbohydrate source. Concentrations of molasses higher than 90 g./liter are found to be somewhat inhibitory, the yields obtained being somewhat lower. However, after the fermentation has progressed for some time, additional molasses or carbohydrate may be added to the fermentation medium with no adverse effect.

As is well known in the art, certain metal salts are required for bacterial growth and must be incorporated in the growth medium in small quantity. In particular, potassium and magnesium salts are required for bacterial growth and are usually incorporated in the form of phosphates and/or sulfates which conveniently supply both phosphorus and sulfur. Further, various trace metals such as iron, cobalt, nickel, copper, zinc and others are also required. These may be added to the nutrient medium in the form of soluble salts or incorporated by employing tap water which already contains these metals for the preparation of the growth medium.

An economical source of L-histidine and L-lysine to be use when molasses is not employed in the fermentation medium is hydrolyzed protein which contains appreciable amounts of the required amino acids. Hydrolyzed casein is particularly suitable as a source of both L-lysine and L-histidine since it contains from about 8% to 9% L-lysine and from about 2% to 3% L-histidine. The hydrohalide salts of L-lysine and L-histidine, for example, the hydrochlorides, may also be used as a source of these amino acids. The free amphoteric form of the amino acids may also be employed.

It is found that when additional amounts of the carbon source are added during the fermentation process concomitant additional L-lysine is beneficial. Approximately from 40 to 100 mg. of L-lysine for each 20 to 30 grams of carbonydrate content is found to give excellent results.

Amounts of the carbohydrate sources other than those described may be employed for the production of diaminopimelic acid, but lower yields may be obtained. The above cited ranges of concentration are preferred since they lead to the best yields of the product.

The product, diaminopimelic acid, may be isolated by standard procedures, for example, ion-exchange methods well known to those in the art. Alternatively, diaminopimelic acid may be converted, in situ, to L-lysine by adding a diaminopimelic acid decarboxylase-producing organism directly to the fermentation broth.

The L-lysine is then isolated by standard methods, for example, ion-exchange treatment, as described in numerous articles in the literature. For example, the reaction mixture is adjusted to pH 2 with hydrochloric acid or sulfuric acid, filtered and the L-lysine absorbed by passing the filtrate through a strong cation exchange resin, such as the sulfonic acid resin, Amberlite, IR–120 (Rohm & Haas Co.) and eluted by dilute alkali such as ammonium hydroxide.

The eluate after boiling to remove ammonia is then passed through a weak cation exchange resin such as the carboxylic acid resin, Amberlite IRC–50 (Rohm & Haas Co.) which absorbs L-lysine. L-lysine is eluted with dilute ammonium hydroxide and the eluate freed of ammonia. L-lysine is obtained as the hydrochloride by adjusting to pH 5.0 and concentrating.

By employing *E. coli*, ATCC 13002 under the preferred conditions mentioned above higher yields of diaminopimelic acid than previously reported are realized. This is indeed an unexpected result, since of a substantial number of mutants of *E. coli* tested, only this double auxotroph is found to produce the herein disclosed yields of diaminopimelic acid. Even more unexpected is the discovery that *E. coli*, ATCC 13002 will accumulate the desirable higher yields of the acid when cultivated on inexpensive carbon sources as herein described. Sucrose, lactose and molasses are of considerably lower cost than glycerol which is a principal constituent of the fermentation process of the above described patent. The combination of the higher yield and the considerably lower cost of the fermentation constituents of the herein described process is a contribution of major importance to the more economical and practical production of diaminopimelic acid. As stated above, diaminopimelic acid is readily converted to L-lysine an essential amino acid of utmost importance as attested to in numerous publications of recent years.

The conversion of L-lysine is effected by contacting diaminopimelic acid with the enzyme systems of a diaminopimelic acid decarboxylase-producing organism of the family, Enterobacteriaceae, for example, *Aerobacter aerogenes, Escherichia coli, Serratia marcescens, Klebsiella pneumoniae, Shigella sonnei*, and others as described in copending application, Serial Number 686,850, filed on September 30, 1957, wherein is described a process for the cultivation of improved enzyme activity by cultivating said organisms in an aqueous nutrient medium comprising glycerine, sucrose, lactose and glucose in the presence of 0.1 equivalent weights of potassium ion and inorganic ammonium compounds or urea as the sole source of nitrogen.

The following examples are given by way of illustration and are not to be construed as limitations of this invention, many variations of which are possible within the scope and spirit thereof.

*Example I*

*E. coli*, ATCC 13002 was rinsed from an agar slant under sterile conditions into a Fernbach flask containing one liter of the following inoculum medium which was previously sterilized at 20 pounds/square inch for 45 minutes:

| | G./L. |
|---|---|
| Crude beet molasses (50% by weight sucrose) | 40 |
| $(NH_4)_2HPO_4$ | 20 |
| $MgSO_4.7H_2O$ | 0.5 |
| L-lysine (as the hydrochloride) | 0.25 |
| Lactose (sterilized separately) | 5 |

The inoculum was maintained at 28° C. with shaking for 20 hours.

Another medium was prepared for the actual production of diaminopimelic acid. This medium had the following composition:

| | G./L. |
|---|---|
| Crude beet molasses (50% by weight sucrose) | 70 |
| $(NH_4)_2HPO_4$ | 20 |
| $MgSO_4.7H_2O$ | 0.5 |
| L-lysine (hydrochloride) | 0.25 |
| Lactose (sterilized separately) | 30 | pH=7.8.

Two liters of the above medium was autoclaved at 20 pounds/square inch for one hour.

One hundred milliliters of the inoculum medium was added to 2 liters of the production medium in a fermenter. The reaction was carried out at 28° C. with stirring at the rate of 1750 revolutions/minute and aeration at a rate of one volume of air per volume of reaction mixture per minute. After 60 hours, the mixture assayed as having a diaminopimelic acid content of 12 g./l.

*A. aerogenes*, ATCC 12409, was grown for 20 hours at 27° C. with shaking in the following inoculum which had previously been sterilized by autoclaving for 20 minutes at 20 pounds/square inch pressure:

| | G./L. |
|---|---|
| $Na_2HPO_4$ | 4.15 |
| $K_2HPO_4$ | 2.0 |
| $(NH_4)_2HPO_4$ | 3.0 |
| $(NH_4)_2SO_4$ | 1.5 |
| $MgSO_4.7H_2O$ | 0.2 |
| Glycerol | 10.0 |

Adjust to pH 7.8 with $NH_4OH$.

Another medium was prepared with identical composition. Two liters of this medium was autoclaved at 20 pounds/square inch pressure for 30 minutes. Twenty five milliliters of the inoculum medium was added to 2 liters of the production medium. The resultant broth was stirred at a rate of 1750 revolutions per minute and aerated at the rate of one volume of air per volume of medium per minute during incubation at 28° C. for 20 hours.

Three hundred milliliters of this broth was added to one liter of the fermentation mixture containing 12 g. of diaminopimelic acid. The mixture was adjusted to pH 8 with $NH_4OH$. Five milliliters of toluene was added and the mixture then placed in a shaker for 10 minutes. The mixture was then incubated stationary at 35° C. After 20 hours, L-lysine was produced in 100% yield. The L-lysine was recovered by ion-exchange treatment.

*Example II*

A production medium was prepared having the following composition:

| | G./L. |
|---|---|
| Crude beet molasses (containing 40% by weight sucrose) | 90 |
| $(NH_4)_2HPO_4$ | 20 |
| $MgSO_4.7H_2O$ | 0.5 |
| L-lysine (as hydrochloride) | 0.2 |
| Sucrose | 10 |

One hundred milliliters of the inoculum as prepared in Example I was added to 2 liters of the production medium in a fermenter flask. The reaction was carried out as described in Example I with comparable results being obtained.

Example III

A production medium was prepared having the following composition:

| | G./L. |
|---|---|
| Sucrose | 60 |
| Acid hydrolysed casein which contains 8.9% lysine and 3.9% histidine | 3 |
| $(NH_4)_2HPO_4$ | 20 |
| $MgSO_4 \cdot 7H_2O$ | 0.5 |
| $K_2HPO_4$ | 5.0 |

One hundred milliliters of an inoculum medium as prepared in Example I was added to 2 liters of this production medium in a fermenter flask. The reaction was carried out as in Example I with comparable results.

Example IV

The procedure of Example III was repeated with 50 grams of lactose in place of sucrose. After 24 hours, 30 g./l. of lactose was added. Comparable results were obtained.

Example V

A production medium was prepared having the following composition:

| | G./L. |
|---|---|
| Sucrose | 40 |
| Lactose (sterilized separately) | 20 |
| $(NH_4)_2HPO_4$ | 20 |
| $MgSO_4 \cdot 7H_2O$ | 0.5 |
| L-lysine (as hydrochloride) | 0.4 |
| L-histidine (hydrochloride) | .01 |
| $K_2HPO_4$ | 5 |

One hundred milliliters of an inoculum medium as prepared in Example I was added to 2 liters of this production medium in a fermenter. The reaction was carried out as in Example I. After 55 hours, the mixture assayed as having a diaminopimelic acid content of 10 grams per liter.

Example VI

A production medium was prepared with the following composition:

| | G./L. |
|---|---|
| Crude beet molasses (50% by weight sucrose) | 70 |
| $(NH_4)_2HPO_4$ | 20 |
| $MgSO_4 \cdot 7H_2O$ | 0.5 |
| L-lysine (as the hydrochloride) | 0.3 |

One hundred milliliters of the inoculum described in Example I was added to 2 liters of this production medium. The reaction was carried out as in Example I. After 24 hours, 70 g. of beet molasses per liter of medium was added. The reaction was continued for a total of 70 hours. The mixture assayed as having 12 g./l. of diaminopimelic acid.

Example VII

A production medium was prepared with the following compositions:

| | G./L. |
|---|---|
| Crude beet molasses (50% by weight sucrose) | 70 |
| $(NH_4)_2HPO_4$ | 20 |
| $MgSO_4 \cdot 7H_2O$ | 0.5 |
| L-lysine (as hydrochloride) | 0.3 |

One hundred milliliters of the inoculum described in Example I was added to 2 liters of this production medium. The reaction was carried out as in Example I. After 24 hours, 70 g. of beet molasses and 80 mg. of L-lysine per liter of medium was added. The reaction was continued for a total of 70 hours. The mixture assayed as having 12 g./l. of diamopimelic acid.

Example VIII

A production medium was prepared having the following composition:

| | G./L. |
|---|---|
| Sucrose | 80 |
| Acid hydrolysed casein which contains 8.9% lysine and 2.9% histidine | 4 |
| $(NH_4)_2HPO_4$ | 20 |
| $MgSO_4 \cdot 7H_2O$ | 0.5 |
| $K_2HPO_4$ | 3 |

One hundred milliliters of an inoculum medium as prepared in Example I was added to 2 liters of this production medium in a fermenter flask. The reaction was carried out as in Example I with comparable results.

Example IX

A production medium was prepared with the following composition:

| | G./L. |
|---|---|
| Crude beet molasses (50% by weight sucrose) | 90 |
| $(NH_4)_2HPO_4$ | 20 |
| $MgSO_4 \cdot 7H_2O$ | 0.5 |
| L-lysine (as hydrochloride) | 0.4 |
| Sucrose | 30 |
| Lysine | 0.4 |

One hundred milliliters of the inoculum described in Example I was added to 2 liters of this production medium. The reaction was carried out as in Example I. After 24 hours, 70 g. of beet molasses and 40 mg. of L-lysine per liter of medium was added. The reaction was continued for a total of 70 hours. The mixture assayed as having 13 g./l. of diaminopimelic acid.

What is claimed is:

1. A process for the preparation of diaminopimelic acid which process comprises cultivating under submerged aerobic conditions at a pH of from about 6 to about 9 E. coli, ATCC 13002 in an aqueous nutrient medium comprising a carbohydrate source selected from the group consisting of sucrose, lactose, a molasses containing at least 40% by weight of sucrose and mixtures thereof, a source of nitrogen, a source of magnesium, a source of potassium, and trace metals, in the presence of an initial concentration of from about 0.2 to about 0.4 gram of L-lysine and from about 0.01 gram to about 0.5 gram of L-histidine per liter of nutrient medium.

2. A process for the preparation of diaminopimelic acid which process comprises cultivating under submerged aerobic conditions at a pH of from about 6 to about 9 E. coli, ATCC 13002 in an aqueous nutrient medium comprising about 100 to about 140 grams per liter of a molasses containing at least 40% of sucrose, a source of nitrogen, a source of magnesium, a source of potassium, a source of trace metals in the presence of an initial concentration of from about 0.2 to about 0.4 gram of L-lysine per liter of nutrient medium.

3. A process for the preparation of diaminopimelic acid which process comprises cultivating under submerged aerobic conditions at a pH of from about 6 to about 9 E. coli, ATCC 13002 in an aqueous nutrient medium comprising a mixture of from about 10 to about 60 grams per liter of sucrose together with from about 40 to 90 grams per liter of a molasses containing at least 40% by weight of sucrose, the total weight of carbohydrate source being at least 100 grams per liter, a source of nitrogen, a source of magnesium, a source of potassium and trace metals, in the presence of an initial concentration of from about 0.2 to about 0.4 gram of L-lysine per liter of nutrient medium.

4. A process for the preparation of diaminopimelic acid which process comprises cultivating under submerged aerobic conditions at a pH of from about 6 to about 9 E. coli, ATCC 13002 in an aqueous nutrient medium comprising from about 10 to about 60 grams per liter of lactose, from about 40 to 90 grams per liter of a molasses containing at least 40% by weight of sucrose, the total weight of carbohydrate source being at least 100 grams per liter, a source of nitrogen, a source of magnesium, a source of potassium and trace metals, in the presence of an initial concentration of from about 0.2 to about 0.4 gram of L-lysine and from about 0.01 gram to about 0.5 gram of L-histidine per liter of nutrient medium.

5. A process for the preparation of diaminopimelic acid which process comprises cultivating under submerged aerobic conditions at a pH of from about 6 to about 9 E. coli, ATCC 13002 in an aqueous nutrient medium comprising from about 60 to about 80 grams of sucrose, a source of nitrogen, a source of magnesium, a source of potassium and trace metals, in the presence of an initial concentration of from about 0.2 to 0.4 gram of L-lysine and from about 0.01 gram to about 0.5 gram of L-histidine per liter of nutrient medium.

6. A process for the preparation of diaminopimelic acid which process comprises cultivating under submerged aerobic conditions at a pH of from about 6 to about 9 E. coli, ATCC 13002 in an aqueous nutrient medium comprising from about 60 to about 80 grams of lactose, a source of nitrogen, a source of magnesium, a source of potassium and trace metals, in the presence of an initial concentration of from about 0.2 to 0.4 gram of L-lysine and from about 0.01 gram to about 0.5 gram of L-histidine per liter of nutrient medium.

7. A process as claimed in claim 2 wherein the molasses is added in at least 2 portions, the second portion being added during a period of from about 16 hours to about 48 hours after the initiation of the fermentation process the initial concentration of molasses in the nutrient medium being at least about 70 grams per liter.

References Cited in the file of this patent

UNITED STATES PATENTS

| | | |
|---|---|---|
| 2,097,292 | Kitzmeyer | Oct. 26, 1937 |
| 2,771,396 | Casida | Nov. 20, 1956 |
| 2,841,532 | Kita et al. | July 1, 1958 |

OTHER REFERENCES

Nature, vol. 169, pp. 533–534, March 1952.

"Advances in Enzymology," by Nord, Interscience Publishers, Inc., New York (1955), vol. 16, pp. 297–299.